Nov. 13, 1962  T. H. PRENTICE  3,063,479
CHOP SAW APPARATUS FOR CUTTING SERIES FED PIECES
Filed Sept. 19, 1960  2 Sheets-Sheet 1

Thomas H. Prentice
INVENTOR.
BY Ramsey and Kolisch
Attys.

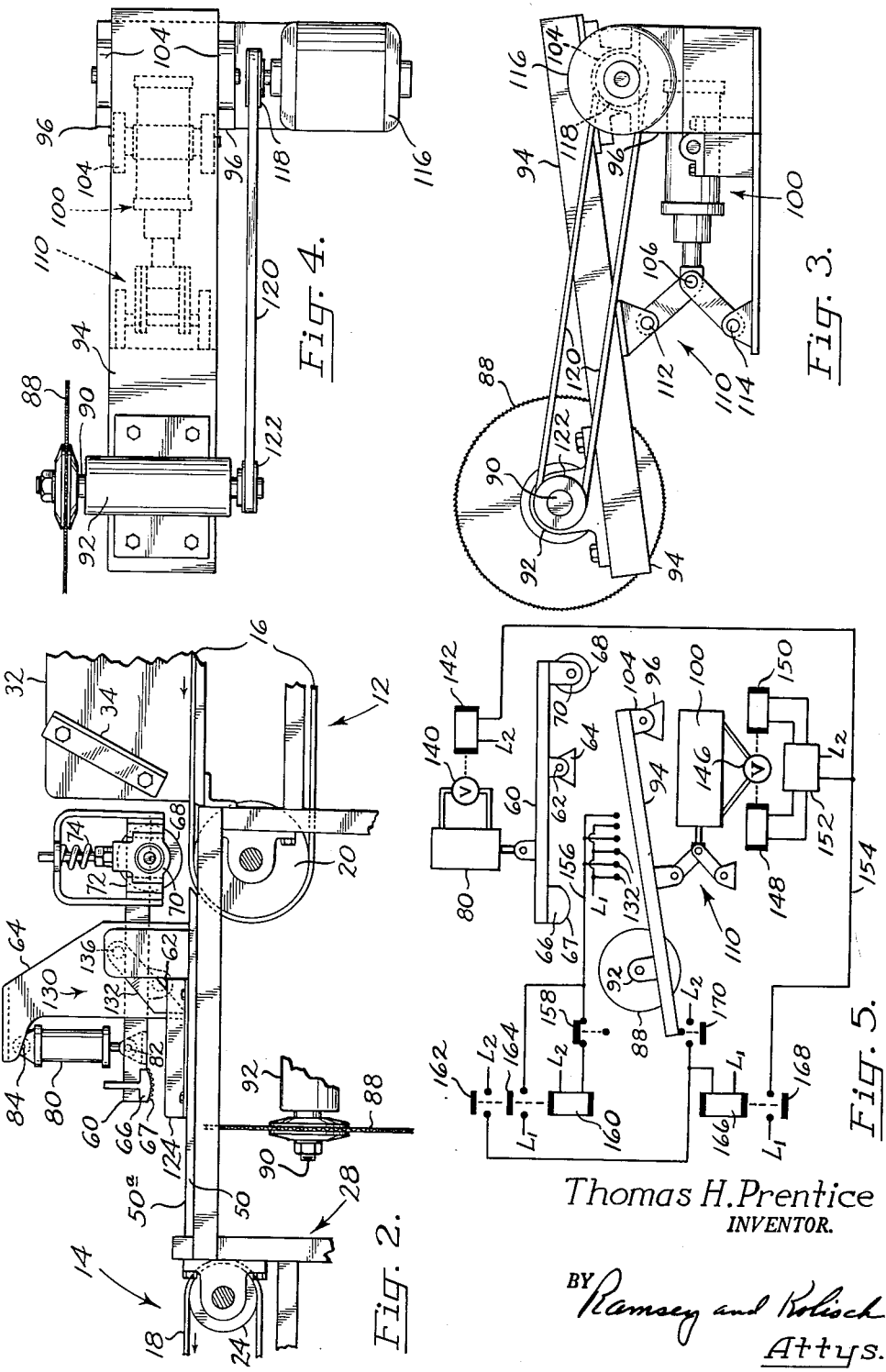

# United States Patent Office 3,063,479
Patented Nov. 13, 1962

3,063,479
CHOP SAW APPARATUS FOR CUTTING SERIES FED PIECES
Thomas H. Prentice, Portland, Oreg., assignor to E. V. Prentice Co., Portland, Oreg., a partnership
Filed Sept. 19, 1960, Ser. No. 57,041
11 Claims. (Cl. 143—46)

This invention relates to "chop" or "trimmer" saw apparatus, of the type that may be used to cut across a board, as when removing imperfections therefrom. The apparatus takes up relatively little room, is easy to operate, and at the same time can handle efficiently a relatively large number of boards during a day's time with the boards passing substantially continuously one after another through the apparatus while receiving the desired cuts.

The invention is described below in connection with the trimming of imperfections from boards or lumber pieces prior to consolidating the trimmed boards into a larger board using, for example, finger joints and adhesive between the ends of adjacent boards whereby the ends are held together. It should be understood, of course, that the chop or trimmer saw may be used in other operations where selective cuts are desired.

In general terms, the apparatus of the invention comprises an elongated feed convey means, and in front of this an off-bearing conveyer means, with a nontraveling support between the discharge end of the feed conveyer means and the feed end of the off-bearing conveyer means. The feed and off-bearing conveyer means operate continuously, and transfer boards lengthwise through the apparatus. A transversely disposed circular saw mounted below the nontraveling support is actuated to swing up into a board resting on the support to produce a cut. Prior to making a cut, a teeter arm above the support and discharge end of the feed conveyer means is swung to move a clamp mounted on one end of the arm down on any board resting on the support, and at the same time to move a pinch roll mounted on the other end of the arm (that normally presses the board down on the feed conveyer) upwardly and away from the feed conveyer. The teeter arm in this position functions to stop a board for cutting, while previously it functioned in conjunction with the feed conveyer to produce positive forward motion in the board. Controlling actuation of the teeter arm and movement of the saw is a sensor means sensitive to a deposit previously prepared on a surface of the board. Boards may be held as a stack on the feed conveyer by a hopper, that is constructed to enable boards one at a time to be removed from the bottom of the stack and be moved forwardly into the bite defined by the normally lowered pinch roll and the discharge end of the feed conveyer.

Thus, a general object of the invention is to provide improved chop saw apparatus constructed to cut boards as they are moved lengthwise one after another in a defined path, and equipped with novel means for temporarily stopping the boards while the cut is made.

Another general object is to provide trimmer or chop saw apparatus where feed and off-bearing conveyers for moving the boards through the apparatus may be kept running constantly, and temporary stopping of the forward travel of boards is through the expedient of lifting and lowering pinch roll mechanism, and clamping mechanism engaging a board as it passes over a nontraveling support.

Another object is to provide fast-acting trimmer saw apparatus where boards travel lengthwise and are stopped prior to making a transverse cut, and where a circular saw is moved to make a cut, such saw being moved in a cutting pass by a double-acting ram connected by toggle structure to a swinging arm supporting the saw, such toggle structure swinging past an overcenter position during a single stroke of the ram whereby the saw is moved back and fourth during the stroke.

A still further object of the invention is to provide novel chop saw apparatus where novel means is provided regulating the stopping of a board and its cutting, such means including sensor means responsive to a deposit previously prepared on a surface of the board.

As contemplated by this invention, an operator stacking boards on the feed conveyer behind the hopper mentioned also functions as an inspector. The operator places a deposit on a board adjacent where it is desired to make a cut. When the board subsequently comes to the bottom of the stack and then is drawn out from under the stack, the deposit moves with the board into the vicinity of a sensor means, which regulates stopping and cutting of the board. The organization is simple, accurate, and easily operated by one man to produce boards with cuts where desired as determined by a previous inspection.

Other features and objects of the invention will become more apparent as the following description is read in conjunction with the accompanying drawings, wherein:

FIG. 2 is a section view taken along the line 2—2 in FIG. 1, illustrating details of the cutting station;

FIG. 3 is a section view with parts removed taken along the line 3—3 in FIG. 1, showing the mounting for the circular saw used, and a ram operable to move the saw in a cutting pass;

FIG. 4 is a top view looking down at the saw and mounting illustrated in FIG. 3; and FIG. 5 illustrates schematically a control system that may be used to regulate movement of the saw and teeter arm.

Figure 1:
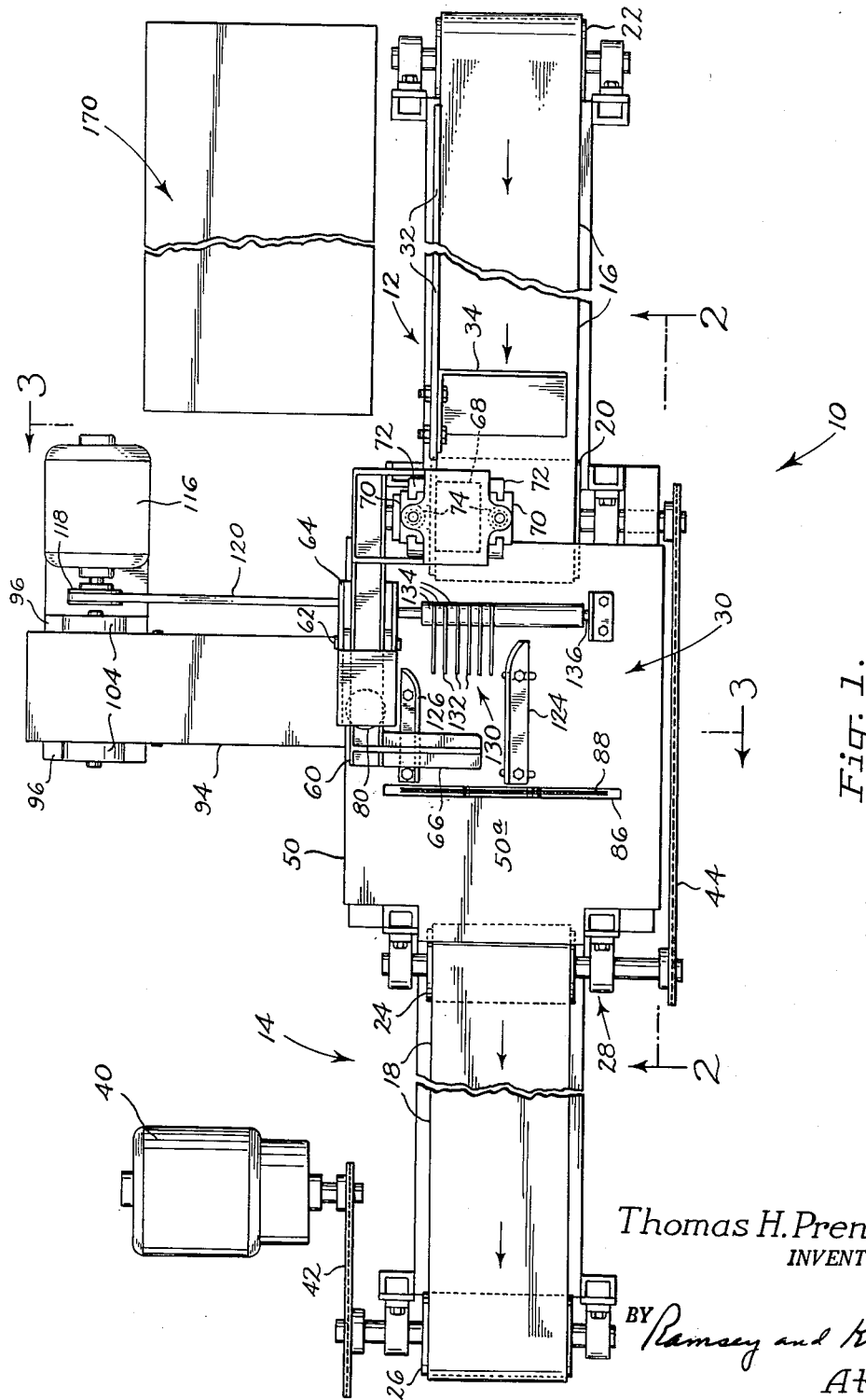
FIG. 1 is a top plan view of apparatus constructed according to this invention, showing at the right of the figure a feed conveyer means for the apparatus, and to the left of the figure an off-bearing conveyer means, and between the two a cutting station including nontraveling support means, a saw, and a teeter arm.

Referring now to the drawings, the chop saw apparatus of the invention is indicated generally in FIG. 1 at 10. The apparatus includes, at the right end in FIG. 1, a feed conveyer means 12, and at the left end in FIG. 1, an off-bearing conveyer means 14. In the embodiment illustrated, each conveyer means comprises an elongated, continuous belt, such as belt 16 for the feed conveyer means and belt 18 for the off-bearing conveyer means, mounted with an upper run extending in a horizontal direction and aligned with the upper run of the belt of the other conveyer means. With reference to FIG. 1, belt 16 of the feed conveyer means is supported on pulleys 20, 22, and belt 18 of the off-bearing conveyer means is supported on pulleys 24, 26. The pulleys are secured to pulley shafts rotatably supported on suitable framework 28. The belts transport boards lengthwise through the apparatus with the boards traveling one after another from right to left in FIG. 1.

The upper run of belt 16 of the feed conveyer means provides support for a stack of boards, and also operates to draw off the bottom board in the stack and move it forwardly with next-above boards following successively. The drawn-off board is moved into a cutting station 30 disposed between the feed and off-bearing conveyer means. Along one side of the upper run of belt 16 is a vertical guide plate 32, used in aligning the sides of boards stacked on belt 16. Adjacent the discharge end of belt 16 and mounted on guide plate 32 is an inclined hopper plate 34. The hopper plate slopes downwardly toward but terminates short of the upper run of belt 16. The spacing between the lower edge of plate 34 and the upper run of belt 16 is sufficient to enable boards one at a time to be drawn off below the hopper plate and advanced forwardly.

The belts of the feed and off-bearing conveyer means are driven by a common motor, indicated at 40. Motor 40 is connected to pulley 26 to rotate the pulley by a drive chain 42. Interconnecting belts 16, 18 so that one is driven by the other is a power-transmitting chain 44 trained over sprockets secured to the pulley shafts for pulleys 24, 20.

Considering now cutting station 30, between the discharge end of the feed conveyer means and the feed end of the off-bearing conveyer means is a nontraveling support plate 50, suitably mounted on framework 28. The support plate has an upper surface 50a that is substantially horizontal and in substantially the horizontal plane of the upper runs of belts 16 and 18. Boards on traveling from the feed conveyer means to the off-bearing conveyer means are stopped momentarily on the support plate, and cut while stopped. After cutting, the boards continue their travel over the support plate and onto the off-bearing conveyer means, as described below.

Regulating movement of boards over support plate 50 is a teeter arm 60 disposed above the support plate and the discharge end of the feed conveyer means. The teeter arm is pivoted intermediate its ends by pivot connection 62 on an upstanding standard portion 64 of the frame. At the left end of the teeter arm is a clamp bar or clamping means 66, secured to the arm and having a knurled lower surface 67 (see FIG. 2). At the right end of the teeter arm and mounted thereon is a pinch or clamp roll 68, which is carried approximately above pulley 20 training the left end of feed conveyer belt 16. Pinch roll 68 is journaled in bearings 70 slidable up and down on a mounting 72. The pinch roll is urged downwardly to a lowered position by compression springs 74.

The teeter arm may be swung about the horizontal pivot axis provided by pivot connection 62 in a counterclockwise direction in FIG. 2, so that its left end moves downwardly and its right end (with its pinch roll) moves upwardly. This brings clamping bar 66 down on the top surface of a board thereunder, to clamp the board against the upper surface 50a of plate 50. This acts to stop the board on the nontraveling support plate 50. The teeter arm may be swung in the opposite direction to bring the pinch roll firmly down on the top surface of a board as it travels on belt 16 over pulley 20, and to move the clamp bar up from off the top surface of a board. In this position for the arm, a board is firmly grasped in the bite between the pinch roll and the conveyer belt, and positively urged forward over support plate 50 by belt 16.

A double-acting ram or motor 80 constitutes power-actuated means for swinging the teeter arm to and fro between the positions described. The ram extends between a pivot connection 82 with the teeter arm and a pivot connection 84 made with standard portion 64. On extension of the ram, the clamping bar moves down and the pinch roll moves upwardly, and on contraction of the ram the opposite is true.

Support plate 50 is provided with an elongated slot 86 (see FIG. 1) extending transversely of the path of travel of boards over the support plate. The slot accommodates the passage upwardly therethrough of the top of transversely disposed circular saw 88. The saw is moved upwardly to make a cut across a board lying on the support plate.

Considering now the mounting for circular saw 88, and referring now to FIGS. 2, 3, and 4, saw 88 is connected to a saw arbor 90 journaled in bearing 92. Bearing 92 is mounted on one end of a swingable arm 94 that is pivotally connected at its other end to uprights 96 of the frame. The arm is swung upwardly to produce a cut, and swung downwardly to return the saw, with the saw thus completing a cutting pass.

Completing the description of the power-actuated means provided for moving the saw in a cutting pass, a double-acting ram or motor 100 has its cylinder end pivotally supported by bearings 104, and its rod end connected at 106 to the middle joint of a toggle link mechanism 110. The ends of the toggle link mechanism are pivotally connected at 112 and 114 to arm 94 and the frame of the apparatus, respectively. By using the toggle link mechanism described, the saw is moved up and down in a cutting pass on a single strike of ram 100, i.e., either by extension or contraction of the ram. This is important, as it makes for a fast action in the saw, and reduces to a minimum the time that a piece must be stopped during the cutting of the piece.

Driving the saw is an electric motor 116. The motor shaft of motor 116 is secured to a pulley 118, which has a drive belt 120 trained thereon. Drive belt 120 extends from pulley 118 over a pulley 122 which is secured to saw arbor 90.

Boards on moving from the feed conveyer means over support plate 50 are guided by guides 124, 126 (see FIG. 1). These are secured to the top of support plate 50. Guide 124 is adjustable with respect to guide 126, to take care of various widths of boards.

Sensor means indicated at 130 positioned between clamp bar 66 and pinch roll 68 are used in controlling actuation of ram 80 connected to the teeter arm (for moving it back and forth) and actuation of ram 100 connected to swingable arm 94 (for moving the circular saw up and down). Sensor means 130 comprise a series of metal feeler plates 132 separated by insulators 134. The plates are mounted in an inclined position (as can be seen in FIG. 2), with their upper ends rotatably supported on a shaft 136 mounted in fixed position above the path of travel of boards therebeneath. The lower ends of plates 132 are positioned to slide over the tops of boards moved forwardly beneath the feeler plates. The feeler plates are connected by a control circuit, such as that illustrated in FIG. 5, to valves controlling rams 80, 100. The feeler plates are sensitive to a deposit (an aqueous saline solution) placed on boards being cut by an operator stacking boards on feed conveyer means 12.

Referring now to FIG. 5, where a control circuit responsive to the feeler plates is disclosed, 140 indicates a valve regulating ram 80 which is ganged to a solenoid 142. When solenoid 142 is energized, valve 140 is adjusted to cause extension of ram 80 with lowering of clamp bar 66 and raising of pinch roll 68, and on deenergizing of the solenoid, valve 140 is adjusted to produce contraction of ram 80 and raising of clamp bar 66. For ram 100, a valve 146 is provided regulated by solenoids 148, 150 which are ganged to the valve. When solenoid 148 is energized, valve 146 is adjusted to cause extension of ram 100, and when solenoid 150 is energized, valve 146 is adjusted to cause contraction of ram 100. A selector device 152 alternately connects either solenoid 148 or solenoid 150 to source conductor L2 and a conductor 154, whereby first one and then the other solenoid is connected in the circuit for the purpose of regulating valve 146.

Alternate plates 132 of sensor means 130 are connected to a source conductor L1, and the other plates of the sensor means are connected to a conductor 156. Conductor 156 is connected through a normally closed switch 158 (switch 158 opening momentarily when saw 88 swings to its uppermost position) to one end of a solenoid 160. The other end of solenoid 160 is connected to source conductor L2. Solenoid 160 is part of a relay that has switches 162, 164 ganged to the solenoid, these switches being normally open but closing on energizing of solenoid 160. Switch 164 is a holding switch for solenoid 160, and switch 162 is an activating switch for a solenoid 166 that is used to start an operating cycle for saw 88 and the teeter arm.

Thus, switch 162 connects, when closed, source conductor L2 with one end of solenoid 166, the other end of which is connected to source conductor L1. Solenoid 166 is ganged to a switch 168, which is normally open, but which is closed by energizing of solenoid 166 to connect source conductor L1 with conductor 154. With switch 160 closed, solenoid 142 is energized, and so also is either solenoid 148 or 150, depending upon the position of selector device 152. A switch 170 regulated by the saw is opened with the saw in its lowered position, and closed when the saw starts its cutting pass, to connect source conductor L2 with solenoid 166.

The circuit described is actuated when a saline deposit produces a closed circuit between any of the plates 132 connected to source conductor L1 and any of the plates 132 connected to conductor 156. When such a closed circuit is produced, solenoid 160 is energized to close switches 162, 164. This produces energizing of solenoid 166 and closing of switch 168, energizing of solenoid 142 to produce extension of ram 80, and energizing of one of the solenoids 148, 150 to produce a stroke in ram 100. Thus, immediately the saw starts upwardly and the clamp bar moves downwardly, but since ram 80 is smaller than the ram 100, clamp bar 66 moves down firmly on top of a board prior to the time saw 88 moves up above the upper surface of support plate 50. The saw on moving upwardly enables switch 170 to close, thus providing another connection of solenoid 166 with conductor L2. Switch 164 holds in solenoid 160 for sufficient time to assure closing of switch 170.

When the saw reaches its uppermost position, switch 158 opens, solenoid 160 is deenergized and switch 170 now provides the only connection of solenoid 166 with source conductor L2. Solenoid 166 remains energized during downward movement of the saw, until switch 170 is opened by the saw, which produces deenergizing of solenoid 166 and opening of switch 168. When this occurs, solenoid 142 is deenergized to cause adjustment of valve 140 so that ram 80 is contracted, bar 66 is raised, and pinch roll 68 is lowered. Device 152 adjusts itself so that on subsequent energizing of solenoid 166, the solenoid 148, 150 which was not just energized is energized the next time a closed circuit is produced in plates 132. From this it will be seen that the saline deposit produces a cycle of operation on passing beneath the feeler plates that causes movement of the clamp bar down on a board, movement of the pinch roll 68 upwardly from the top of a board, and movement of the saw up and down in a cutting pass.

Explaining the operation of the apparatus as a whole, an operator picks boards from off an elevator table, such as that indicated generally at 170, and places them behind hopper plate 34 and against guide plate 32. The boards are placed one on top of another, to form a stack supported on feed conveyor means 12. As the boards are stacked, the operator at the same time notes imperfections, and where a cut is desired he places a deposit of a saline solution, using for example any conventional dauber.

The feed and off-bearing conveyor means are running constantly. Thus, when there is no board directly in front of the hopper plate that would prevent movement of a board out from under the hopper plate, the bottommost board in the stack is slid out from under the stack under the forward urging of belt 16. The board is moved forwardly by the belt into the bite between pinch roll 68 and the position of belt 16 supported on pulley 20 directly therebelow. Thence, the board is held firmly while it is advanced over support plate 50. Forward progress of the board continues until any saline deposit on the board comes under feeler plates 132. When this occurs, the cycle of operation just described for the saw and teeter arm is started, with clamping of the board in a stationary position, and cutting of the board. The parts are constructed so that the board comes to rest with the saline deposit thereon substantially directly over slot 86 and saw 88.

After the board is cut, if the just cut-off forward portion of the board is long enough to extend appreciably over the off-bearing conveyor belt, the board travels off plate 50 under the urging of the belt out of cutting station 30. When the teeter arm is swung after a cut to move the pinch roll down on the just cut-off rear portion of the board, this portion is moved forwardly and onto the support plate moving any board in front of it forwardly and onto belt 18. If the just cut-off rear portion is too short to extend over belt 16, its movement forwardly is produced by a board behind it pushing it.

It will be noted that the cutting of boards is substantially continuous, with boards being fed to the cutting station as fast as cuts are made in the boards. Cuts on the boards are controlled by a deposit made on the boards, and the operator stacking boards on the feed conveyor means also functions as an inspector. The boards travel lengthwise, and are positioned mechanically and automatically with respect to the saw. The deposit made on a board that controls cutting does not detrimentally affect the board.

While an embodiment of the invention has been described, it is obvious that the parts and their organization could be changed without departing from the invention. It is desired to cover all modifications and variations that would be apparent to one skilled in the art, and that come within the scope of the appended claims.

It is claimed and desired to secure by Letters Patent:

1. Chop saw apparatus comprising feed conveyer means for transporting boards along a path, nontraveling support means adjacent and in front of the discharge end of the feed conveyer means, a teeter arm above said support means and the discharge end of the feed conveyer means with clamping means mounted thereon disposed above said support means and pinch roll means mounted thereon disposed above the discharge end of the feed conveyer means, pivot means pivotally mounting the teeter arm intermediate said clamping and pinch roll means with said clamping means swingable toward and away from said support means and with said pinch roll means swingable toward and away from said conveyer means, a power-driven saw mounted to one side of said support means, and means for moving the saw in a cutting pass to cut a board when such a board lies on said support means and when said clamping means has swung toward said support means to clamp onto the board.

2. Chop saw apparatus comprising a constantly driven feed conveyer defining an elongated path for transporting boards lengthwise thereon, a constantly driven off-bearing conveyer defining a path that is a continuation of the path of the feed conveyer and spaced a distance forwardly of the discharge end of the feed conveyer, nontraveling support means between the discharge end of the feed conveyer and the feed end of the off-bearing conveyer, a teeter arm above the discharge end of the feed conveyer with clamping means mounted thereon disposed above said support means and pinch roll means mounted thereon disposed above the discharge end of the feed conveyer, pivot means mounting the teeter arm intermediate said clamping and pinch roll means with the clamping means swingable toward and away from said support means and with the pinch roll means swingable toward and away from said feed conveyer, power-actuated means for swinging said teeter arm, a circular saw positioned transversely of the paths defined by said feed and off-bearing conveyers and mounted below said support means, and means for raising said saw to a position above said support means and returning it in a cutting pass so as to cut a board resting on the support means.

3. The apparatus of claim 2 wherein the saw is mounted on a swingable arm that is swung in a path back and forth during a cutting pass for the saw, and wherein a double-acting ram and toggle link structure is connected to said arm for moving the arm, said toggle link structure swinging past an overcenter position during a single stroke of the ram and in so doing swinging said arm back and forth in its path.

4. Chop saw apparatus comprising an elongated continuous feed conveyer belt with an upper run defining a path for the movement of a board lengthwise therealong, a hopper plate mounted above said upper run of the feed conveyer belt adjacent its discharge end and constructed to hold a stack of boards on said upper run of the feed conveyer belt, said hopper plate being spaced a distance above said upper run sufficient to enable a single layer of boards to slide out from under the stack held by said hopper plate under the urging of said feed conveyer belt, a nontraveling support forwardly of the discharge end of said upper run, a teeter arm disposed above said support and the discharge end of said upper run of the feed conveyer belt, clamping means mounted on one end of said teeter arm above said support and pinch roll means mounted on the other end of said teeter arm above said discharge end of said upper run, pivot means mounting the teeter arm for pivotal movement between a position where said clamping means is swung down on said support and said pinch roll means is raised above said discharge end and a position where said clamping means is raised from said support and said pinch roll means is swung down on said discharge end, power-actuated means for pivoting said teeter arm between said positions, a power-driven saw mounted to one side of said support, means for moving the saw in a cutting pass whereby it is moved into and then out of a board positioned on said support, and sensor means forwardly of the hopper plate and to the rear of said saw responsive to a deposit prepared on a board and regulating pivotal movement of said teeter arm and movement of said saw.

5. Chop saw apparatus comprising an elongated normally constantly driven continuous friction-type feed conveyer belt for carrying boards lengthwise along a path, means for holding a stack of boards above said conveyer belt with the bottom board of the stack resting on the conveyer belt and constantly urged forwardly thereby, an elongated continuous off-bearing conveyer belt spaced forwardly of the discharge end of the feed conveyer belt and receiving boards as they are advanced thereto by said feed conveyer belt, a nontraveling support between the discharge end of the feed conveyer belt and the feed end of the off-bearing conveyer belt, a circular saw disposed transversely of the path of boards between the feed and off-bearing conveyer belts and mounted to one side of said path and between said discharge and feed ends, power-actuated means for clamping a board on said support as it passes from said feed conveyer belt to said off-bearing conveyer belt, such board when clamped on said support serving to block the forward movement of boards along the constantly driven feed conveyer belt, power-actuated means for moving said saw in a cutting pass by shifting it into and then out of a board positioned on said support, and sensor means spaced toward said feed conveyer belt from said saw responsive to a deposit prepared on a board and connected to the power-actuated means for clamping a board and the power-actuated means for moving said saw so as to regulate their actuation.

6. Chop saw apparatus comprising an elongated feed conveyer belt for carrying boards lengthwise along a path, an off-bearing conveyer belt spaced forwardly of the discharge end of the feed conveyer belt and receiving boards as they are advanced thereto by said feed conveyer belt, a nontraveling support between the discharge end of the feed conveyer belt and the feed end of the off-bearing conveyer belt supporting a board as it passes between the two, a circular saw disposed transversely of the path of boards traveling between the feed conveyer belt and off-bearing conveyer belt and mounted to one side of said path and between said discharge and feed ends, a teeter arm disposed above said support and the discharge end of the feed conveyer belt with clamping means mounted thereon disposed above said support and pinch roll means mounted thereon disposed above the discharge end of the feed conveyer belt, pivot means pivotally mounting the teeter arm accommodating swinging of the arm in one direction with movement of said clamping means down toward said support accompanied by movement of said pinch roll means away from said discharge end and swinging of the arm in the opposite direction with movement of said clamping means away from said support accompanied by movement of the pinch roll down toward said discharge end, power-actuated means for swinging said teeter arm and power-actuated means for moving said saw in a cutting pass by shifting it into and then out of a board positioned on said support, sensor means responsive to a deposit prepared on a board adjacent said support at the location of said saw and spaced toward the feed conveyer belt from said saw, and means connecting the sensor means and said pair of power-actuated means whereby the latter are controlled by the former and a board is clamped on said support by said clamping means prior to movement of said saw into such a board.

7. The apparatus of claim 6 wherein the power-actuated means for moving the saw comprises a swingable arm mounting the saw that is swung back and forth during a cutting pass for the saw, a double-acting ram, and toggle link structure connecting the ram and swingable arm, said toggle link structure swinging past an overcenter position during a single stroke of the ram and in so doing swinging said arm back and forth in its path.

8. Chop saw apparatus comprising an elongated continuous feed conveyer belt with an upper run constructed to transport boards lengthwise along a path, a hopper plate positioned above said upper run adjacent the discharge end of said run for holding a stack of boards on the run, said plate being spaced from said run a sufficient distance to enable boards to be withdrawn from the bottom of the stack as a single layer under the urging of the feed conveyer belt, a nontraveling support in front of the discharge end of the upper run of said feed conveyer belt for supporting boards as they move off said belt, a transversely disposed circular saw mounted below said nontraveling support and mechanism for moving the saw up past said support and into a board resting thereon and then returning the saw, a teeter arm disposed above said support and the discharge end of said belt run, said teeter arm having one end adjacent the saw and clamping means mounted on said one end and an end opposite said one end disposed above the discharge end of said run and pinch roll means mounted on said opposite end, means pivotally mounting the teeter arm between its ends accommodating movement of said one end down toward the support with said other end moving upwardly and movement of said other end down toward said belt run with said one end moving upwardly, a motor for moving said teeter arm and a motor for actuating the mechanism for moving the saw, sensor means approximately intermediate the ends of the teeter arm and below it and positioned to engage the upper surface of a board passing below the teeter arm, said sensor means being responsive to a deposit prepared on the top surface of the board, and means connecting the sensor means and said motors whereby the motors are controlled by said sensor means with said teeter arm moving to swing said clamping means downwardly prior to said saw moving upwardly into a board.

9. In apparatus for cutting pieces such as boards and the like, conveyer means for transporting the pieces along a path, nontraveling support means adjacent and in front of the discharge end of said conveyer means, a teeter device adjacent said support means and the discharge end of said conveyer means having a clamping means mounted thereon disposed above said support means and a pressure-applying means mounted thereon disposed above the discharge end of said feed conveyer means, means pivotally mounting said teeter device accommodating pivotal movement of said clamping means toward said support means with said pressure-applying means moving away from said conveyer means and pivotal movement of said clamping means away from said support means with said pressure-applying means moving toward said conveyer means, said pressure-applying means having a construction accommodating the movement of a board thereunder when the pressure-applying means has been moved toward said conveyer means and a power-driven cutter mounted for movement in a cutting pass to cut a piece lying on said support means and engaged between said support means and said clamping means.

10. In apparatus for cutting pieces such as boards and the like, means for feeding the pieces to a cutting station and for holding the pieces stationary in said station, said means comprising feed conveyer means for transporting boards along a path and nontraveling support means adjacent the discharge end of said feed conveyer means, a teeter device mounted adjacent said support means and the discharge end of said feed conveyer means having a clamping means mounted thereon disposed above said support means and a pressure-applying means mounted thereon disposed above the discharge end of said feed conveyer means, pivot means pivotally mounting said teeter device whereby said clamping means is swingable toward said support means with said pressure-applying means swinging away from said feed conveyer means and said clamping means is swingable away from said support means with said pressure-applying means swinging toward said feed conveyer means, said pressure-applying means having a construction accommodating the movement of a board thereunder when the pressure-applying means has been moved toward said conveyer means and means for actuating said teeter device in its movement.

11. Chop saw apparatus comprising an elongated friction-type normally constantly driven conveyer means defining a path for the movement of boards lengthwise therealong, a hopper mounted above said conveyer means and constructed to hold a stack of boards with the bottom layer of boards of such a stack supported on said conveyer means, said hopper being constructed to accommodate the removal of bottom layers of boards from under such a stack under the urging of said conveyer means, a nontraveling support disposed forwardly of the discharge end of said conveyer means, clamping means mounted adjacent said nontraveling support, means for actuating said clamping means whereby it is operable to hold a board firmly in place on said nontraveling support, such board when clamped serving to block the forward movement of boards along the constantly driven conveyor means, a power-driven saw mounted to one side of said support, and a mounting for said saw whereby it is movable in a cutting pass to cut a board held stationary by said clamping means.

References Cited in the file of this patent

UNITED STATES PATENTS

| | | |
|---|---|---|
| 1,836,751 | Delanay | Dec. 15, 1931 |
| 1,968,091 | Nash | July 31, 1934 |
| 2,652,864 | De Anguera | Sept. 22, 1953 |

Disclaimer 3,063,479.—*Thomas H. Prentice*, Portland, Oreg. CHOP SAW APPARATUS FOR CUTTING SERIES FED PIECES. Patent dated Nov. 13, 1962. Disclaimer filed June 12, 1964, by the inventor and the assignee, *E. V. Prentice Co.*

Hereby enter this disclaimer to claims 5 and 11 of said patent.

[*Official Gazette September 8, 1964*]